United States Patent
Kaminsky

[15] 3,658,627
[45] Apr. 25, 1972

[54] PLASTIC WELDING TOOL

[72] Inventor: Stanley J. Kaminsky, 619 Neponset Street, Norwood, Mass. 02062

[22] Filed: Oct. 29, 1969

[21] Appl. No.: 871,480

Related U.S. Application Data

[63] Continuation-in-part of Ser. No. 594,052, Nov. 14, 1966, abandoned.

[52] U.S. Cl..............................156/497, 156/306, 156/313
[51] Int. Cl..........................................................C09j 5/06
[58] Field of Search...................................156/497, 306, 313

[56] References Cited

UNITED STATES PATENTS

| R24,801 | 3/1960 | Kaminsky | 156/497 |
| 2,084,625 | 6/1937 | Stebbins et al. | 156/497 UX |
| 2,372,737 | 4/1945 | Phillips, Jr. | 156/497 |
| 2,689,801 | 9/1954 | D'Alelio | 156/497 UX |
| 2,722,964 | 11/1955 | Duncan | 156/497 |

Primary Examiner—Benjamin A. Borchelt
Assistant Examiner—G. E. Montone
Attorney—Chittick, Pfund, Birch, Samuels & Gauthier

[57] ABSTRACT

A tool heated by hot air for use in welding thermoplastic materials.

11 Claims, 11 Drawing Figures

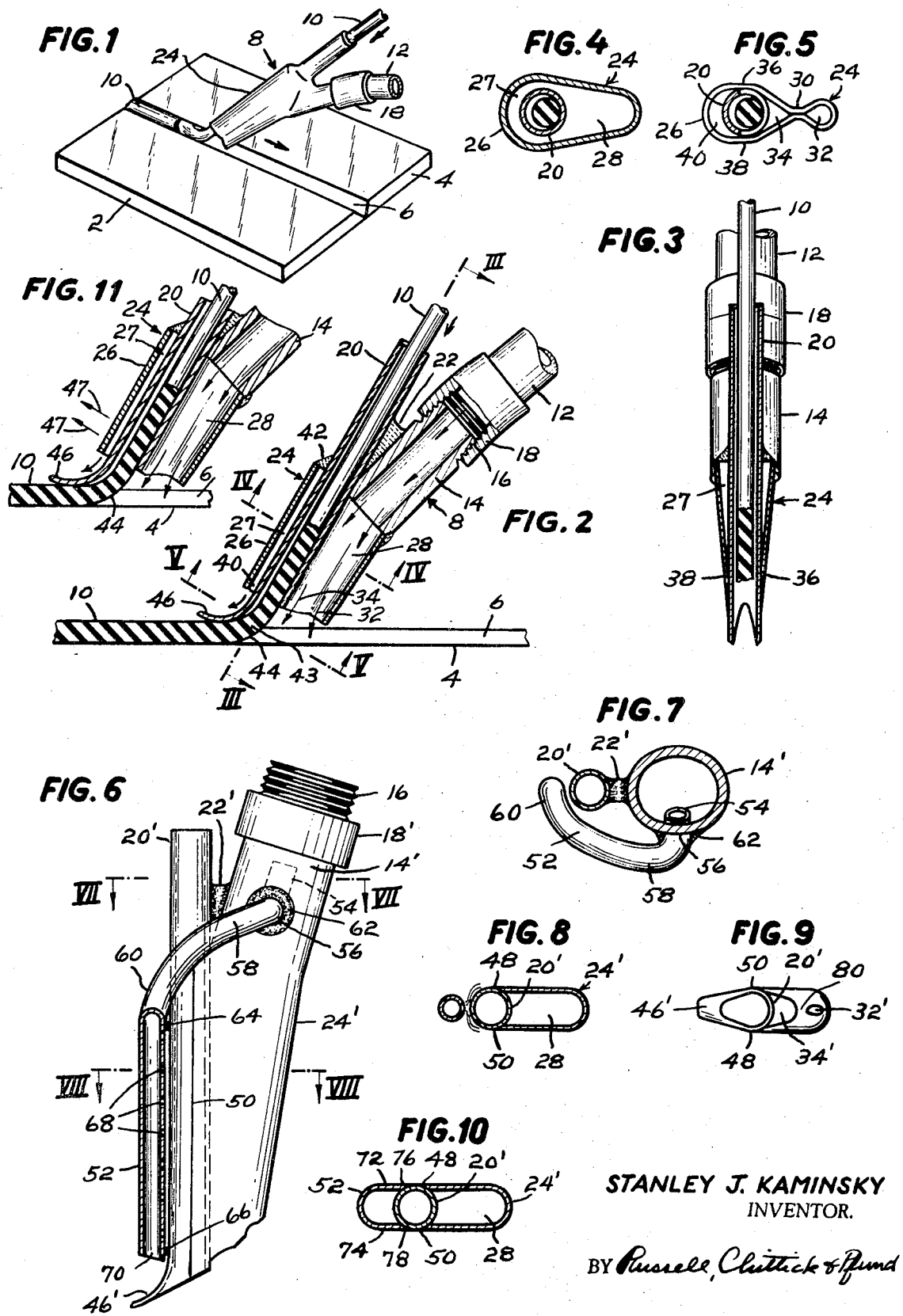

PLASTIC WELDING TOOL

This application is a continuation-in-part of Ser. No. 594,052 filed Nov. 14, 1966 now abandoned, by Stanley J. Kaminsky for PLASTIC WELDING TOOL.

SUMMARY OF THE INVENTION

Reissue Pat. No. 24,801 issued Mar. 22, 1960 to S. J. Kaminsky for TOOL FOR WELDING THERMO-PLASTIC MATERIALS discloses a unit which has gone into extensive use in the plastics welding field. Since 1960, new plastic compositions have been developed which soften and melt at considerably higher temperatures.

Accordingly, the tool disclosed in U.S. Pat. No. Re. 24,801, when dealing with plastics of higher softening and melting temperatures, cannot achieve welding at the same rate that has been common with plastics of lower softening and melting temperatures.

The present invention, therefore, is concerned with a new and improved welding tool capable of utilizing more efficiently hot air of the same temperature heretofore used with the plastics of lower softening temperatures. The tool achieves softening and surface melting of the new plastics at the same or faster rate as previously accomplished by the old tool on plastics of lower softening temperatures. This result is achieved by a tool construction which permits the moving welding rod to receive heat more rapidly from the tool than heretofore possible. In this way, the heat to which the welding rod is subjected prior to reaching the welding position is substantially greater than that which could be supplied to the rod by previous tool constructions. This advance is accomplished by the inclusion of means associated with the rod tube through which the welding rod or filler material passes on its way to the weld position whereby the rod tube is heated to maximum temperature about its entire circumference thereby to apply heat more rapidly to the welding rod both by conduction and radiation.

In the species shown in the drawings and explained hereinafter, this result is achieved by completely jacketing the rod tube in one case and in the other using means which is substantially the equivalent of the full jacket, the difference being that the hot air is divided but applied simultaneously to opposite sides of the rod tube.

The construction also includes means whereby the temperature applicable to the welding rod may be reduced somewhat within the scope of the tool construction to meet the temperature requirements of welding rods of different melting characteristics.

These and other aspects of the invention will become more apparent as the description proceeds with the aid of the accompanying drawings.

DESCRIPTION OF THE DRAWINGS

FIG. 1 is a perspective view showing the position of the tool in use as it lays and presses welding rod or filler material in the space between the base materials that are to be welded.

FIG. 2 is an enlarged view of a preferred form of the tool shown in vertical section and illustrating the manner in which the welding rod is laid in welding position, pressed, smoothed and guided by an element extending to the rear at the lower end of the rod tube.

FIG. 3 is a section on the line III—III of FIG. 2.
FIG. 4 is a section on the line IV—IV of FIG. 2.
FIG. 5 is a section on the line V—V of FIG. 2.
FIG. 6 illustrates a second species of the invention shown in side elevation.
FIG. 7 is a section on the line VII—VII of FIG. 6.
FIG. 8 is a section on the line VIII—VIII of FIG. 6.
FIG. 9 is a bottom view of FIG. 6.
FIG. 10 is a section of an alternative form corresponding in principle to FIG. 8.
FIG. 11 shows an alternative porting arrangement applied to FIG. 2.

DESCRIPTION OF PREFERRED EMBODIMENTS

Referring to FIG. 1, the general position of the tool with respect to one common arrangement of base materials that are to be welded is shown. Sheets abutting at right angles may also be welded in the same manner. The two portions of adjacent base materials are indicated at 2 and 4. The adjacent sides have been cut at a slope to provide a V-shaped space 6 therebetween. The tool indicated generally at 8, which is moved in the direction of the arrow, provides means for receiving a length of welding rod 10, heating it as it advances downwardly through tool 8 to be heated to a softened condition, and finally to be welded into position in the V-shaped space 6 through melting of the engaging surfaces by virtue of direct application thereto of air of sufficient temperature. The hot air is supplied through piping 12 to flow continuously through the tool thereby to bring the temperature of the material up to the required softening and welding points. Then the tool can be moved by hand or machine continuously along the open V-shaped groove to deposit therein and induce correct welding of the welding rod to the V-shaped sides.

Now referring to FIGS. 2 to 5, the tool construction will be described in more detail. The tool 8 comprises a hot air tube 14 having at its upper end threads 16 which engage with a threaded connection at 18 attached to the hot air piping 12. Rod tube 20 is welded to hot air tube 14 by the weld indicated at 22. It will be understood, however, that the entire tool might be case as a single unit or fabricated or formed in whole or in part in another suitable manner. Rod tube 20 may be of any selected length. Preferably, the upper portion, which is unjacketed, will help to support the rod. The lower portion of the rod tube is jacketed and is long enough so that the heat that is applied thereto will have time to soften adequately the welding rod 10 as it passed downwardly therethrough.

Explaining further, the lower end of hot air tube 14 includes a hot air jacket 24 which completely surrounds the lower portion of rod tube 20 as at 26. As shown in FIG. 4, the jacket 24 has a substantial air space 28 at the leading side of the tool and a smaller air space 27 at the rear side. There is adequate clearance between rod tube 20 and rear wall 26 so that hot air can flow freely from hot air tube 14 into the jacket 24 and around all sides of rod tube 20.

On referring to FIG. 5, however, it will be noted that the cross-sectional configuration of jacket 24 changes as the lower end thereof is approached. The opposing side walls are squeezed together so that at the bottom of the jacket they meet at 30 to provide two separate bottom openings 32 and 34. Likewise, the walls of jacket 24 on opposite sides of tube 20 directly engage the tube as at 36 and 38, but the space 27 between the rear wall 26 and rod tube 20 preferably remains open at the bottom as indicated at 40 to insure adequate flow of hot air. See FIGS. 2 and 5. The meeting of the lower walls of jacekt 24 with the opposite sides of rod tube 20 is also illustrated in FIG. 3. The upper end of the space 27 between the rod tube 20 and rear wall 26 is closed by a suitable weld 42.

The effect of this construction is that hot air entering the tool from piping 12 flows downwardly through the hot air tube 14 into space 28 within jacket 24. Then part of the hot air travels laterally around the lower part of rod tube 20 and thence downwardly to escape at three positions, through forward port 32, through the main port 34, and through the rear port 40. The hot air, however, cannot escape at the lower sides of rod tube 20 because of the engagement of the jacket 24 with the rod tube at the lower end thereof as at 36 and 38.

The restrictions provided by the partial closure of jacket 24 at 30 and at the side positions 36 and 38 insure (1) that there will be an adequate flow of hot air around rod tube 20 to provide the requisite temperature for softening the welding rod 10 so it can bend readily as shown at 43 and (2) that the hot air leaving the tool at the lower end will be directed to the proper areas with maximum efficiency to melt the surfaces about to be joined in the weld. Thus as the tool is advanced along the line of the weld, the hot air escaping from aperture 32 effects a preheating of the surfaces of the V-shaped space 6. The hot air escaping through aperture 34 is effective to melt the under surface of welding rod 10 and the V surfaces 6 to the extent required for producing a perfect weld. The welding rod 10, having been adequately heated as it moves downwardly through rod tube 20 within that portion heated by the hot air within jacket 24, bends readily to move into the V-shaped space.

A guiding and pressing element 46, extending to the rear from the lower part of rod tube 20, is designed to engage the welding rod 10. Its underside is ordinarily shaped to conform more or less with the upper surface of the welding rod. If the rod is round, the under surface would preferably be concave. If the rod is triangular, then the under surface would preferably be flat. The intention is to utilize element 46 as a tool guiding member and as means for pressing the welding rod downward into the joint while at the same time burnishing and smoothing the upper surface of the rod to produce the required finished appearance.

Element 46 is preferably heated to a greater or less degree according to the characteristics of the welding rod. For minimum heating of element 46, port 40 of FIG. 2 may be closed as in FIG. 11 so that no hot air impinges thereon. Heat may be supplied to element 46 in controlled degree by varying the size of port 40. With the temperature and pressure of the incoming hot air known, it is thus possible to produce and to control the desired temperature in element 46.

The construction of the jacket 24 and related ports also makes it possible to vary the temperature of the rod tube 20. In the construction shown in FIG. 2, with port 40 open, the hot air flows downwardly and around that part of tube 20 that is within jacket 24 to produce maximum tube temperature. The tube temperature may be reduced by restricting or closing port 40 to limit or stop air flow about the rear side of tube 20. Since the welding rod is constantly receiving heat from the tube, the average tube temperature may thus be reduced.

Another means of controlling or varying the tube temperature is by introducing one or more ports 47 in the rear side of jacket 24 while port 40 is closed as shown in FIG. 11. The flow of hot air around tube 20 may thus be controlled in the same manner as by restricting port 40 without having any of the hot air directed against element 46.

In summary of the above, the temperature of element 46 may be varied, and the temperature of rod tube 20 may be varied, independently or together, to meet the varying requirements of the welding rod that is used.

It will be appreciated that, while the construction shown in FIG. 5 indicates two ports 32 and 34 as a preferred arrangement, nevertheless this could be a continuous opening, in which case the spacing between the sides at 30 would preferably be of reduced dimension. In any event, the hot air discharge must be such that the preheating and final heating of the surfaces of the materials to welding condition will meet the correct requirements.

Another species of the invention is shown in FIG. 6 and 10 inclusive. The same principle of operation is present therein in that means is provided for heating the lower portion of rod tube 20' about its entire circumference. Instead of completely jacketing the tube as in FIGS. 1 to 5 only the front half, more or less, is jacketed. The rear half, more or less, of the rod tube is heated to substantially the same degree by projecting enough of the high temperature hot air against the rear surface. This construction is considered to be the equivalent of that shown in FIGS. 1 to 5.

The construction of FIGS. 6 to 9 is made as follows: the threaded connection 18' is in series with a hot air tube 14' from which extends downwardly a jacket 24'. This jacket, instead of extending rearwardly and surrounding rod tube 20' as in FIGS. 1 to 5, is welded or otherwise secured to the rod tube along the opposite sides as at 48 and 50, which welds extend from just below weld 22' to the bottom of rod tube 20'. The lower end of jacket 24' has two apertures 32' and 34' corresponding to the apertures 32 and 34 shown in FIG. 5 of the first species. The lower rear end of the rod tube 20' terminates in a rearwardly extending guiding and pressing element 46' similar to the element 46 of the first species.

It is apparent from an inspection of FIG. 8 that the hot air passing downwardly through jacket 24' will effectively heat the forward half of rod tube 20'. The rearward half of this tube is heated in the following manner. An auxiliary pipe 52 has one end 54 located within hot air tube 14'. Pipe 52 passes laterally out through the hot air tube at 56, then swings rearwardly at 58 and downwardly at 60 into a position parallel to and closely spaced from rod tube 20'. It is effectively held in this position by a major weld at 62 and other smaller welds at 64 and 66. The forward side of pipe 52 facing rod tube 20' has a plurality of openings therethrough as at 68. The lower end of pipe 52 at 70 may be closed or restricted sufficiently so that the hot air under pressure and flowing downwardly through pipe 52 will escape in substantial quantities through holes or openings 68 to impinge directly on the rear side of rod tube 20'. This will heat the rear half of tube 20' to a temperature substantially corresponding to that produced by the jacketed hot air on the leading side of tube 20'.

The hot air flowing downwardly from the more or less restricted opening 70 may be directed to impinge on the top side of element 46' to insure a proper temperature for pressing and burnishing of the upper side of the rod 10 as it is laid into welding position. If the lower end of pipe 52 is closed at 70 then the element 46' will be heated by conduction from rod tube 20'. Closure of opening 70 will not impede circulation through pipe 52 because the perforations 68 remain unchanged.

The construction of FIGS. 6 to 9 just described results in developing a high enough temperature in the lower jacketed part of tube 20' to heat quickly those welding rods of high softening temperatures that will be used in the welding operation.

A further modification of the construction shown in FIGS. 6 to 9 is illustrated in FIG. 10. This is a section taken substantially on the line VIII—VIII of FIG. 6. The pipe 52 at a position immediately below the weld 64 has been split along its forward side and the adjacent walls 72 and 74 have been opened and welded or otherwise secured to tube 20' at 76 and 78. In this manner the hot air flowing downwardly through pipe 52 engages directly against the rear wall of tube 20' instead of impinging on it by lateral flow through ports 68 shown in FIG. 6. This modification is to be considered the equivalent of the form shown in FIG. 2 in that the rod tube is in effect surrounded by a jacket through which hot air passes to heat the tube uniformly about its entire circumference. The engagement of the jacket along the sides 48 and 50 instead of being spaced therefrom as in FIG. 4 is a matter of manufacturing convenience and does not change the principle of heating the rod tube about its circumference by the flow of hot air thereagainst.

In all instances, it will be seen that means have been provided for increasing the effective temperature of the welding rod tube 20 or 20' to a higher percentage of the temperature of the hot air being supplied through pipe 12. In this way, the tool becomes more efficient because the softening of the rod 10 to a point where it can bend readily occurs more quickly, permitting the tool to be advanced along the line of weld at a more rapid rate. Prior art constructions using hot air of the same temperature take longer for the rod to reach its bending temperature. Thus in the prior art, advance of the tool and the corresponding welding rate was necessarily at a lower speed.

In the construction shown in FIGS. 6 to 9, the hot air escaping from aperture 32' does the preheating of the wall surfaces 6 while the hot air escaping from aperture 34' is adequate to melt the surfaces of the V wall and the underside of rod 10 immediately at the point of weld so as the tool advances and the rod 10 is laid in the groove a perfect weld is achieved.

With some types of welding rod, it has been found that the use of the pressing element 46 or 46' may tend to mar the surface to an undesirable extent. In such case, the pressing element may be omitted without affecting the operation of the rod heating structure which supplies the necessary heat to the welding rod enabling the sufficiently softened rod to flow into the V notch 6 in welding relation without additional pressure.

It is intended to cover all changes and modifications of the examples of the invention herein chosen for purposes of the disclosure which do not constitute departures from the spirit and scope of the invention.

I claim:

1. A tool for welding thermo-plastic base materials together, said tool comprising a rod tube for receiving a welding rod of plastic material and delivering it in softened, bendable condition to a welding position, a hot air tube for receiving hot air under pressure, means in series with said hot air tube for delivering part of said hot air against substantially the entire circumference of the lower part of said rod tube to raise the temperature of the entire circumference of said rod tube over a sufficient length thereof to soften said welding rod to bendable condition for delivery to the welding position and at least one aperture at the lower part of said hot air delivering means and forward of said rod tube for delivering hot air directly to all of the surfaces to be melted for welding.

2. A tool for welding thermo-plastic base materials together as set forth in claim 1, a pressing and guiding element extending rearwardly from the lower end of said rod tube and an aperture in said hot air delivering means to the rear of said rod tube for directing some of said hot air against said element.

3. A tool for welding thermo-plastic materials together as set forth in claim 1, said rod tube being secured to said hot air tube, the means in series with aid hot air tube for delivering part of said hot air against said rod tube comprising a jacket extending along part of said rod tube and secured thereto, said aperture being at the lower end of said jacket.

4. A tool for welding thermo-plastic base materials together as set forth in claim 1, said means for delivering hot air to said rod tube comprising a jacket in series with said hot air tube, said jacket extending around and spaced from said rod tube, said jacket engaging said rod tube at its sides close to the lower end, said aperture being at the lower end of said jacket.

5. A tool for welding thermo-plastic base materials together as set forth in claim 1, said rod tube being secured to said hot air tube, the means in series with said hot air tube for delivering part of said hot air to the circumference of said rod tube comprising a jacket secured to said hot air tube and engaging said rod tube along opposite sides thereof whereby hot air from said hot air tube may flow against that part of the circumferential surface of said rod tube that is within the length of said jacket, and comprising further a smaller tube connected to the interior of said hot air tube to divert thereinto some of said hot air passing through said hot air tube, a portion of said smaller tube located close to the rear of and generally parallel to said rod tube and having openings therethrough opposite said rod tube to direct hot air against another part of the circumferential surface of said rod tube, said aperture being at the bottom of said jacket.

6. A tool for welding thermo-plastic base materials together as set forth in claim 5, said smaller tube having a bottom opening to the rear of said rod tube.

7. A tool for welding thermo-plastic base materials together as set forth in claim 1, said rod tube being secured to said hot air tube, the means in series with said hot air tube for delivering part of said hot air to the circumference of said rod tube comprising a jacket secured to said hot air tube and engaging said rod tube along opposite sides thereof whereby hot air from said hot air tube may flow against that part of the circumferential surface of said rod tube that is within the length of said jacket, and comprising further a smaller tube connected to the interior of said hot air tube to divert thereinto some of said hot air passing through said hot air tube, said smaller tube having a longitudinal opening over part of its length, said rod tube having part of its surface secured within said opening, and said aperture being at the bottom of said jacket.

8. A tool for welding thermo-plastic base materials together as set forth in claim 4, said jacket being made of sheet material and secured to said hot air tube and said rod tube at its upper end thereby to provide a continuous closed passage to the lower end of said jacket, the area of the aperture at the lower end of said jacket being substantially less than the maximum cross-sectional area of said jacket whereby escape of hot air may be retarded to improve heat transfer to said rod tube.

9. A tool for welding thermo-plastic base materials together comprising a rod tube through which passes a welding rod during the welding operation, means for utilizing high temperature hot air for heating said rod by radiation and conduction to bendable condition while within said rod tube and for heating, by the direct application of hot air, the converging surfaces of the base materials and the under surface of said rod to melting condition just prior to welding contact thereof as the tool is advanced along the line of weld, said means comprising a jacket surrounding said rod tube and spaced therefrom over at least a major part of the rod tube circumference, means for delivering hot air to said jacket from a hot air source whereby said rod tube will be heated substantially uniformly over that part of its length that is within said jacket, at least one opening at the bottom of said jacket for allowing escape of said hot air, the said opening acting to direct hot air to the surfaces of said base materials and rod that are about to be welded as the tool is advanced.

10. A tool for welding thermo-plastic base materials together as set forth in claim 9, said jacket over a part of the length of said rod tube being completely spaced therefrom.

11. A tool for welding thermo-plastic base materials together as set forth in claim 9, said rod tube having a rearwardly extending guiding and pressing element said jacket having another bottom aperture above said element whereby some of the said hot air may be directed at said element.

* * * * *